United States Patent [19]

Mandt

[11] Patent Number: 4,576,720

[45] Date of Patent: Mar. 18, 1986

[54] SUBCYCLONIC JET RECIRCULATION GRIT REMOVAL SYSTEM

[76] Inventor: Mikkel G. Mandt, 2309 Grand Blvd., Cedar Falls, Iowa 50613

[21] Appl. No.: 611,838

[22] Filed: May 18, 1984

[51] Int. Cl.[4] ............................................. C02F 3/22
[52] U.S. Cl. .................................. 210/626; 210/629;
 210/197; 210/195.3; 210/220; 210/262
[58] Field of Search ............... 210/207, 197, 194, 261,
 210/262, 220, 209, 195.3, 512.1, 626, 628, 621,
 629

[56] References Cited

U.S. PATENT DOCUMENTS

| | | | |
|---|---|---|---|
| 3,695,439 | 10/1972 | Dupre | 210/197 |
| 3,941,698 | 3/1976 | Weis | 210/801 |
| 4,033,875 | 7/1977 | Besik | 210/207 |
| 4,107,038 | 8/1978 | Weis | 210/208 |
| 4,259,185 | 3/1981 | Mixon | 210/197 |
| 4,376,045 | 3/1983 | Siskind | 210/208 |

Primary Examiner—Benoit Castel
Attorney, Agent, or Firm—Fitch, Even, Tabin & Flannery

[57] ABSTRACT

Methods and apparatus for subcyclonic grit separation under aeration conditions utilizing elevated wastewater hydraulic jet recirculation systems.

6 Claims, 4 Drawing Figures

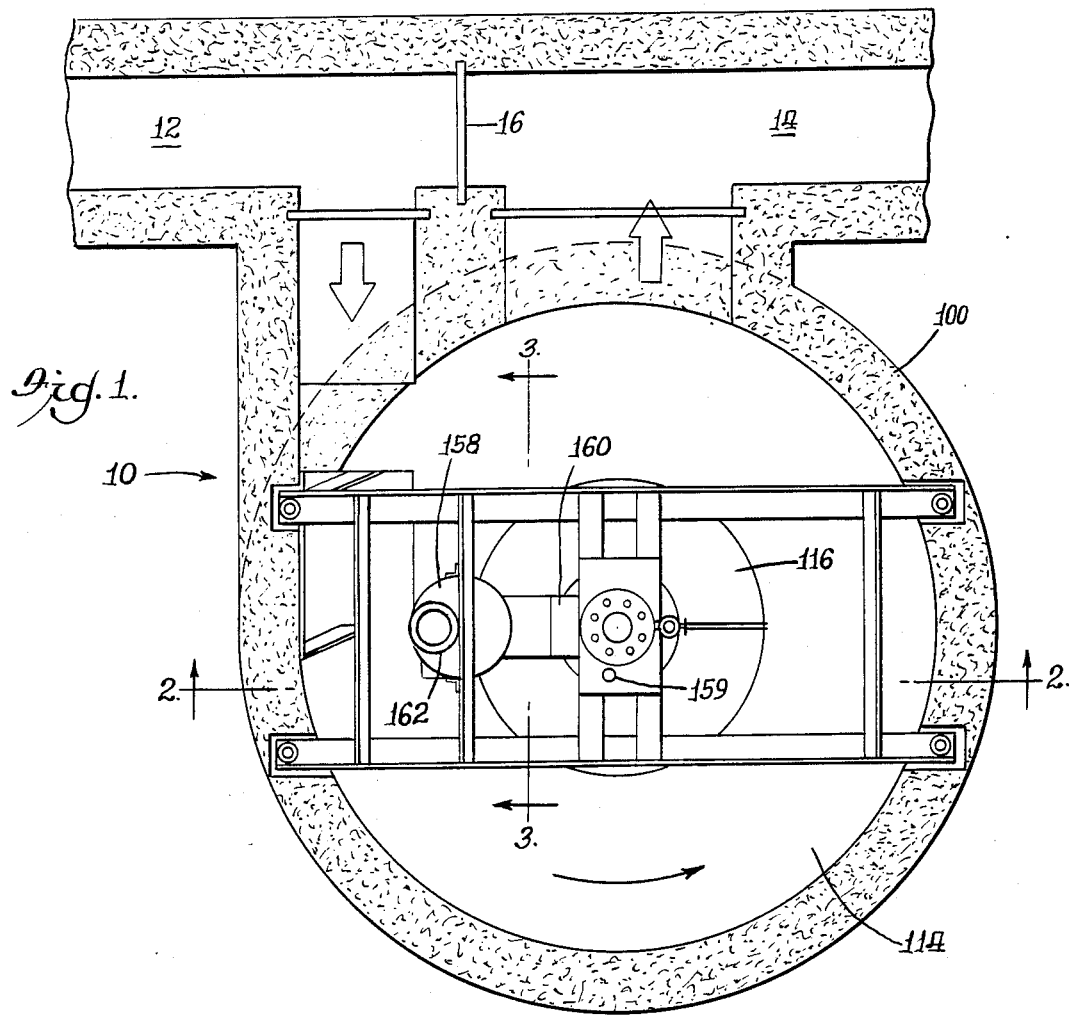
Fig. 1.
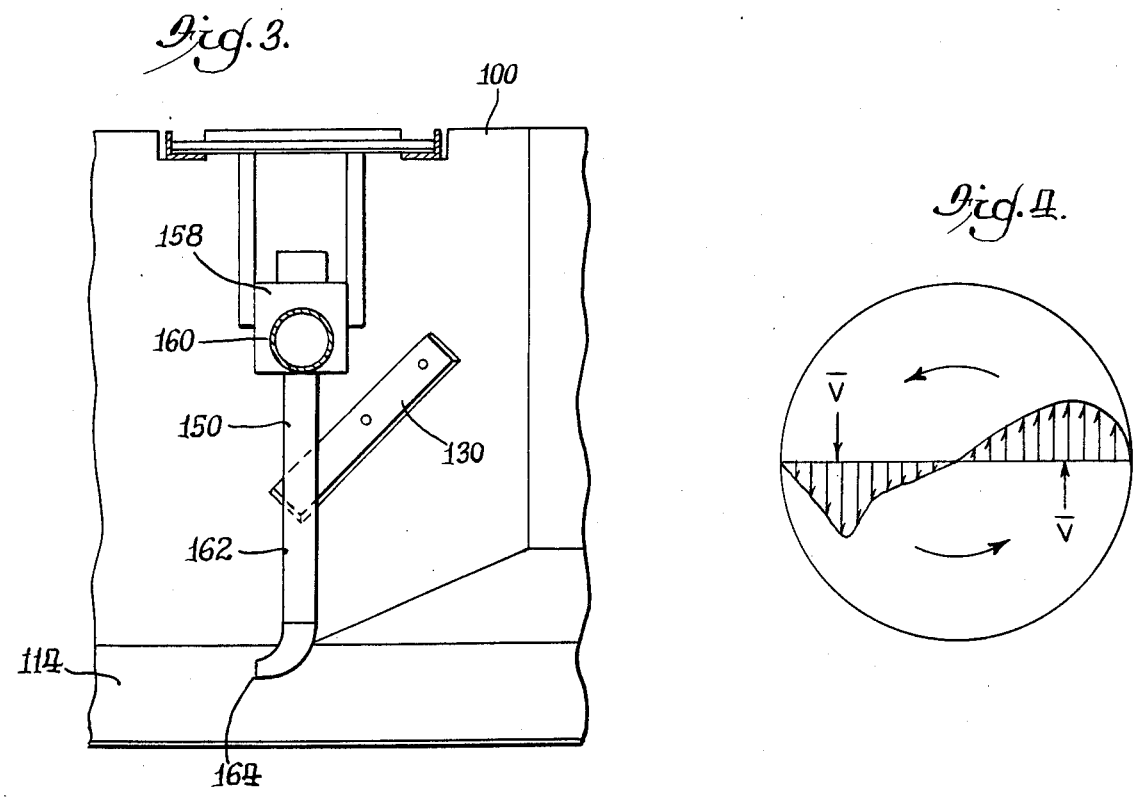
Fig. 3.
Fig. 4.

SUBCYCLONIC JET RECIRCULATION GRIT REMOVAL SYSTEM

The present invention relates to methods and apparatus for separating inorganic particulate materials from particulate organic components in the treatment of wastewater, and more particularly, relates to subcyclonic grit removal systems which may be utilized for wastewater treatment.

In the treatment of wastewater, such as municipal sewage and the like, the removal of grit is an important processing step which is generally carried out prior to biological treatment of the wastewater to remove organic and solubilized wastewater components. Grit is primarily composed of inorganic particulate solids such as sand, soil or other coarse sedimentary components which may enter the wastewater stream directly or indirectly through infusion into the sewerage system. The inorganic grit particles may be free of organic components, or may be present in organic-inorganic composite solids. It is desirable to remove the dense and abrasive inorganic components because they may damage or wear pumps or other mechanical treatment devices and may accumulate in subsequent treatment facilities such as clarifiers, digestors, treatment basins or other tankage where the accumulation of such solid particulate inorganic components is detrimental to the continuous and efficient operation of the facility. The presence of grit may also adversely affect the processing of organic biological byproducts of the wastewater treatment operations.

In accordance with conventional practice, the differential sedimentation velocities of the generally denser grit particles in respect to the lighter organic wastewater solids has been utilized to effect grit separation. Substantial effort has been directed to develop tankage velocities and quiescent flow patterns which are effective in providing both grit separation and removal. For example, U.S. Pat. No. 3,710,941 illustrates sedimentation tankage utilizing an air diffusing device adjacent one wall to create a circulatory movement of the sewage about a horizontal axis parallel to the wall, together with a grit trough equipped with a mechanical screw conveyor to remove accumulated grit. Similarly, U.S. Pat. No. 3,630,372 is directed to a grit chamber including a fully submerged eductor to establish a generally toroidal circulation within the tank. Subcyclonic rotation of the wastewater has also been applied in an effort to provide compact grit separation apparatus for wastewater. In this regard, U.S. Pat. Nos. 3,941,698 and 4,107,038 are directed to grit removing apparatus employing mechanical paddles or propellers which rotate about a vertical axis in the center of the chamber.

However, despite the developments in the art of wastewater treatment and grit removal systems, improved methods and apparatus for effecting grit removal in wastewater influent streams would be desirable. Conventional grit separation apparatus may be undesirably large or inefficient, may have deficiencies in separating inorganic components from organic components in wastewater particulates, may permit the wastewater to become anaerobic or putrescent, or may require separate motors or other mechanical functional elements which are expensive to operate and maintain. Accordingly, it is an object of the present invention to provide improved methods and apparatus for removal of grit from wastewater.

These and other objects of the invention will become apparent from the following detailed description and the accompanying drawings of which:

FIG. 1 is a top view of an embodiment of a subcyclonic grit separation apparatus utilizing an aeration jet recirculation system in accordance with the present invention;

FIG. 3 is a partial cross-sectional side view of the subcyclonic grit separator of FIG. 1, taken through line 3—3, illustrating the recirculation jet; and FIG. 4 is a schematic representation of the wastewater velocity profile of the embodiment of FIG. 1 at an intermediate position along a line 4—4 of FIG. 2 between the wastewater surface and the recirculation jet discharge.

Figure 2:
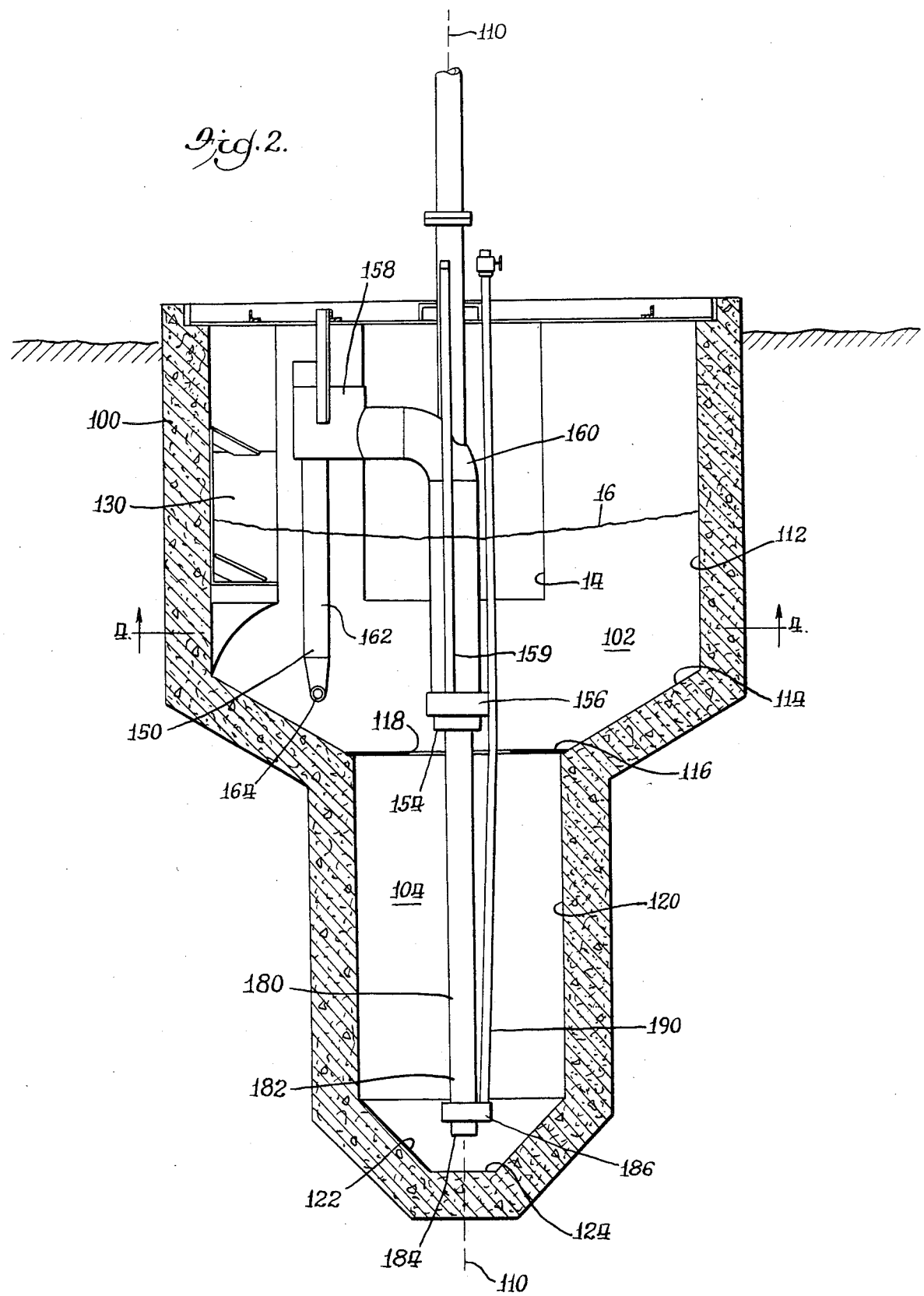
FIG. 2 is a cross-sectional side elevation of the subcyclonic grit separator of FIG. 1, taken through line 2—2.

Generally in accordance with the present invention, methods and apparatus are provided for the removal of grit from a wastewater stream such as municipal sewage, while maintaining the wastewater in an aerobic condition.

In accordance with grit separation apparatus aspects of the present invention, a subcyclonic sedimentation tank is provided which is substantially radially symmetrical about a central vertical axis. The subcyclonic sedimentation tank will generally have a lower grit accumulation surface projecting inward from the outer tank wall toward the central axis. In addition, a lower sediment accumulation tank is provided beneath and in axial alignment with the sedimentation tank which is in fluid communication therewith along the central vertical axis. The sedimentation tank will include an inlet means for tangentially introducing the wastewater inlet stream to be degritted into the subcyclonic sedimentation tank at its periphery. The degritting apparatus will also have outlet means for discharging a degritted wastewater stream. The sedimentation tank will desirably have sufficient volume such that under design flow conditions of influent and effluent flow, the sedimentation tank will provide an average retention time in the range of at least about 10 seconds, and preferably in the range of from about 15 to about 100 seconds. Of course, under low flow conditions, substantially greater retention times are provided. An important feature of the subcyclonic grit apparatus is the provision of a wastewater recirculation aeration jet system, which is specifically adapted for grit removal. In this regard, the system comprises air lift pump means for continuously withdrawing a portion of the wastewater from the sedimentation zone adjacent the sediment accumulation surface at the central vertical axis at a rate of at least about 0.02 of the volume of the wastewater in the sedimentation treatment tank per minute and more preferably at a withdrawal rate in the range of from about 0.05 to about 1.5 of the volume of the wastewater in the sedimentation treatment zone per minute. The air lift pump means also function to introduce into the withdrawn stream at least about 0.1 standard cubic foot of air per gallon of the recirculation stream for aeration of the withdrawn stream, and for lifting the withdrawn stream to an elevation of at least about one foot above the surface of the wastewater in the sedimentation treatment zone. Desirably, the air lift pump means will introduce from about 0.2 to about 0.5 standard cubic feet of air per gallon of withdrawn recirculation wastewater stream.

Also in accordance with the present invention, the wastewater recirculation subcyclonic grit separation apparatus includes means for conducting the elevated, aerated recirculation stream beneath the surface of the wastewater and for discharging the recirculation stream at an average discharge velocity of at least about 5 feet per second and preferably at a discharge velocity in the range of from about 7 to about 15 feet per second, into the wastewater in the sedimentation tank in the direction of the tangential wastewater influent flow, at one or more locations radially displaced from the central axis.

In accordance with method aspects of the present invention, wastewater to be treated is introduced tangentially into an upper sedimentation treatment zone which is substantially radially symmetrical about a central vertical axis and having a lower grit accumulation surface projecting inward toward the central axis, and communicating at the center thereof with a lower sediment accumulation surface at the central vertical axis. As previously indicated in respect to apparatus aspects of the present invention, the sedimentation treatment zone will desirably have a volume sufficient to provide an average retention time of from about 10 to about 100 seconds for the design wastewater flow to be treated. Further in accordance with such methods, a portion of the wastewater is continuously withdrawn from the sedimentation zone adjacent the sediment accumulation surface at the central vertical axis at a rate of at least about 0.02 of the volume of the wastewater in the sedimentation treatment zone per minute and more preferably in the range of from about 0.05 to about 1.5 of the volume of the wastewater in the sedimentation treatment zone per minute, to provide a recirculation wastewater stream. The withdrawn recirculation stream is aerated and subjected to turbulent mixing by introducing air into the withdrawn stream at a rate of at least about 0.1 standard cubic foot of air per gallon of the recirculation stream, and more preferably at an introduction rate in the range of from about 0.2 to about 1.0 standard cubic feet of air per gallon of the recirculation wastewater stream. Also in accordance with the degritting method, the aerated recirculation stream is lifted to an elevation of at least about one foot, and preferably at least about 1.5 feet above the surface of the wastewater in the sedimentation treatment zone. At least a portion of the air which has been introduced into the wastewater stream is separated from the stream at an elevation above the surface of the wastewater in the sedimentation zone, and the aerated wastewater recirculation stream, which has been elevated above the wastewater surface in the sedimentation treatment zone is subsequently discharged into the sedimentation zone at an average discharge velocity of at least about 5 feet per second, and more preferably at least about 7 feet per second. In this regard, the aerated recirculation stream may desirably be conducted beneath the surface of the wastewater in the sedimentation zone and discharged at a jet velocity of at least about 5 feet per second into the wastewater in the sedimentation zone in the direction of the tangential wastewater influent flow at one or more locations radially displaced from the central axis. Preferably, the jet discharge velocity should be at least about 7 feet per second and more preferably will be in the range of from about 7 to about 15 feet per second at the point of discharge into the sedimentation zone. In operation, the recirculation jet(s) functions to transfer momentum to the wastewater in the sedimentation treatment zone, to provide a subcyclonic rotational velocity to the wastewater in the sedimentation zone. Desirably, the average rotational velocity of the wastewater should be maintained at a value of at least about 0.5 feet per second, and typically at least about 1 foot per second. In operation, a forced vortex in conjunction with gravity forces grit to the sedimentation accumulation surface where it moves with other material towards the central axis of the sedimentation zone. At the center, lighter organic particles are withdrawn with the aeration jet recirculation stream where the organic particles and sewage are aerated, subjected to turbulent mixing, lifted to an elevated head for use in driving a circulating jet mixer to provide subcyclonic rotational flow and a controlled degree of localized turbulence displaced radially from the axis of the sedimentation zone. Degritted wastewater is discharged from an upper portion of the sedimentation chamber functionally displaced from the driving jet or jets.

Having generally described various aspects of the present invention, the subcyclonic grit removal systems will be more particularly described with respect to the specific embodiment illustrated in the accompanying drawings. In this regard, illustrated in FIGS. 1–3 is an embodiment 10 of a subcyclonic grit removal apparatus in accordance with the present invention, which is adapted to receive wastewater influent from a wastewater influent channel 12, and to discharge an aerated, degritted wastewater stream in an aerobic condition by means of discharge channel 14. As will be explained in more detail hereinafter, because the illustrated grit removal apparatus 10 does not require substantial hydraulic head of the influent to be treated, the influent channel 12 and the discharge channel 14, which serves as the input channel to the subsequent wastewater treatment apparatus, may be at substantially the same elevation. In this connection, in the illustrated embodiment 10, the channels 12, 14 form a continuous channel separated by baffle 16.

The subcyclonic grit separator 10 comprises a tank 100 which may be constructed of a suitable material such as concrete or steel. The subcyclonic grit separator tank 100, as shown substantially to scale in FIGS. 1 and 2, is radially symmetric about a vertical axis shown at numeral 110 at the center of the tank 100, and defines an upper cylindrical—frustroconical grit sedimentation chamber 102 and a lower cylindrical—frustroconical grit retention chamber 104 of relatively smaller diameter than the upper grit sedimentation chamber 102. As shown in FIG. 1, the upper grit sedimentation chamber 102 is defined by a generally right cylindrical upper wall 112, which in the illustrated embodiment 10 has a radius of about 3 feet from the central axis 110 for a design treatment capacity of 1 MGD (million gallons per day). The sedimentation chamber 102 has a lower grit sedimentation surface formed in part by frustroconical wall 114 which is radially symmetrical about the axis 110, and which slopes inwardly toward the axis 110 from its intersection with the cylindrical wall 112 to its intersection with right cylindrical wall 120 defining the upper portion of the grit retention chamber 104. The nominal inner radius of the illustrated wall 114 is 1.5 feet. A generally flat plate 116 having a circular central opening 118 extends radially inwardly from the interior edge of the frustroconical wall 114 to separate the sedimentation chamber 102 from the grit retention chamber 104.

An inlet channel, which is in fluid communication with the channel 12, directs the influent wastewater into the upper grit sedimentation chamber tangentially at the outer periphery of the chamber. An outlet channel, adjacent the inlet channel 106, discharges the degritted effluent from the upper grit sedimentation chamber to the channel 14. In the illustrated embodiment, the frustroconical wall section 112 has a vertical height of about 1 foot from the top surface of the plate 116, and the discharge channel 14 (FIG. 2) is formed in the wall 112 such that its lower surface is one foot above the plane of intersection of the cylindrical wall 112 with the frustroconical surface 114. Accordingly, it will be appreciated that the minimum height of wastewater retained in the retention basin is about 2 feet under conditions of zero input flow rate. With increase of wastewater, influent flow rate through influent channel 12, the water level will rise within the sedimentation tank 102. At the nominal design capacity of 1 MGD for the embodiment 10, the upper surface 16 of the wastewater in the tank 102 will rise approximately 6 inches, to an elevation 2.5 feet above the plate 116. The dimensions may be readily proportioned to increased (or decreased) design treatment capacities.

In operation, the wastewater in the sedimentation chamber 102 rotates in a counter-clockwise direction (FIG. 1) at a rotational velocity and under appropriate sedimentation conditions that grit particles settle to the grit sedimentation surface formed by the wall 114 and plate 116 and are urged under in the forced vortex conditions toward the center 118 of the plate 116, where they fall into the grit retention chamber 104. A baffle 130 may be provided to provide the incoming and circulating wastewater with a downward velocity component to aid in sedimentation.

An important feature of the subcyclonic grit removal apparatus 10 is the aeration jet circulator system 150 which is adapted to withdraw wastewater from a position adjacent the bottom of the upper frustoconical grit sedimentation chamber 102, aerate the liquid, subject the liquid to turbulent mixing, elevate the liquid above the surface of the wastewater into the sedimentation chamber 102, and discharge the aerated wastewater liquid within the upper grit sedimentation chamber at a position radially displaced from the axis of rotation of the chamber 102. The aeration circulator jet system 150 comprises an upright conduit 152 axially surrounding a grit removal pipe 182 within the upper grit sedimentation chamber 102. The conduit 152 has an intake opening 154 which is disposed adjacent the lower surface of the upper grit sedimentation chamber and the grit sedimentation opening communicating between the upper grit sedimentation chamber 102 and the lower grit storage chamber 104. The withdrawal of the specified flow of waste water at the opening to the grit retention chamber 104 permits separation of lighter solids moving toward the opening, into the withdrawn fluid stream, while the heavier grit solids settle into the grit retention chamber.

The aeration jet circulator conduit 152 is provided with an air supply manifold 156 surrounding the conduit 152 and disposed adjacent its inlet opening 154, which is supplied by means of pressurized air supply pipe 158. The manifold 156 is adapted to introduce air into the conduit 152 by means of appropriately disposed openings thereinto, in order to provide an air lift pump within the conduit, between the interior wall of the conduit 152, and the exterior wall of the grit removal system conduit 182. The introduction of air into the conduit 152, in addition to pumping and aerating the wastewater flow withdrawn thereby into the conduit 152 provides significant turbulence within the conduit as the discharged air bubbles force their way through the wastewater liquid. This turbulence is adapted to dislodge and segregate inorganic grit particles from grit-organic matter composite particles which may be present in the wastewater, while confining these turbulent effects such that sedimentation in the tank 102 is not adversely affected. The conduit 152 extends above the liquid level of the upper grit sedimentation chamber, where it communicates with air-liquid separation chamber 158 by means of right angle conduit connector 160. The illustrated connector 160 permits passage of the grit removal conduit 182 therethrough, while confining the flow of withdrawn wastewater and injected air and diverting it radially from the central axis 110 to the air-liquid separation chamber 158. The air-liquid separator chamber 158 is constructed as a cylinder having a diameter substantially larger than the diameter of the conduits 152, 160, and which is provided with an open top to permit escape of air therefrom upon separation of the air - wastewater liquid mixture supplied to the separator 158 from the conduit 152. The separator 158 is also in fluid communication with the downwardly descending jet supply conduit 162, at the distal end of which is a jet nozzle 164 disposed to deliver a wastewater jet generally orthogonally to the radius vector from the axis 110, adjacent the sloping, conical wall 114 at the outer periphery of the upper grit sedimentation chamber 102. In operation of the embodiment 10, the aerated wastewater recycle jet is radially displaced from the axis 110 a distance of more than half of the radius of the cylindrical wall 112 at an elevation about 6 inches above the bottom surface formed by plate 116 of the sedimentation tank 102. The introduction of the jet into the wastewater in the sedimentation tank creates an expanding, localized zone of turbulence as the tank wastewater is educted into the recirculation jet concommitantly with momentum transfer from the jet to the wastewater liquid in the tank. This zone of turbulence is adapted to separate grit which may be combined with composite inorganic-organic particles in the watewater recycle stream. In addition, it will be appreciated that because the jet 164 is positioned at the point of tangential introduction of the influent wastewater, the localized zone of turbulence downstream of the jet nozzle 164 intersects the influent stream and the surface of the wall 114 locally in the downstream of the nozzle, thereby similarly subjecting the influent stream particles and settled particles, including any composite inorganic-organic composite particles, to conditions adapted to dislodge inorganic grit from organic components.

The illustrated apparatus 10 further includes an air scour and grit removal system disposed along the central axis 110 of the tank 100 for scouring and removing grit disposed within the lower grit retention chamber 104. The air scour and grit removal system 180 comprises a pipe 182 disposed along the axis of the tank 100 and having an opening 184 positioned adjacent the bottom surface 124 of the lower grit storage chamber 104. An air manifold collar 186 is positioned around the pipe 182 adjacent the inlet opening 184, and is adapted to introduce air from the interior of the collar 186 into the pipe 182 through a series of periodically spaced suitable openings (not shown). The manifold 186 may be provided with pressurized air by means of pressurized air supply conduit 190. The air may be supplied at a pressure only slightly greater than the hydrostatic pressure at the point of introduction, and may be supplied to the conduit 190 by any suitable pressurized air source. For wastewater treatment facilities which utilize submerged jet aerators or other pressurized air aeration systems for downstream wastewater treatment, the relatively small amount of pressurized air utilized by the scour and grit removal system may conveniently be provided by the jet aeration blowers of the jet aeration treatment facility. In the illustrated embodiment 10, the grit removal pipe 182 may have a nominal diameter of about four inches, and may be discharged to a suitable repository or disposal site for the grit accumulated in the chamber 104.

In operation, the grit separation apparatus 10 provides a controlled degree of subcyclonic circulation for proper grit removal, independent of the feed stream flow. Thus, for highly variable flows such as influent flows to municipal wastewater treatment facilities, a controlled degree of circulation may be provided irrespective of the flow rate through the system. The aeration jet wastewater recirculation system provides several other distinct advantages. When in operation, the aeration circulator aerates the sewage passing through the grit chamber providing a preaeration step whereby sewage is discharged from the system in an aerobic condition. The aeration circulator also provides washing of the grit and separation of the organic fraction from the inorganic grit fraction, as previously discussed. Since circulation is not dependent upon the inlet feed stream velocity or hydraulic head, the grit chamber can be designed so that there is substantially no head loss through the system. The energy requirement for the aeration jet recirculation system is extremely low, and may average less than 1 hp per MGD design flow. The system may also readily be provided with an air scour and grit removal system, as shown in FIG. 2. In this regard, a separate air lift system extending to the bottom of a grit collection chamber or hopper may be incorporated to wash grit and remove washed grit for ultimate disposal in accordance with conventional practice. The illustrated grit collection chamber has a diameter of about 3 feet and a depth of about 4 feet below the sedimentation chamber.

Standard process design parameters for the illustrated embodiment 10 are based on removal of grit particles 0.2 mm in diameter and larger. However, the design parameters of the system 10 may be readily varied to provide for removal of smaller particles if desired. A principle of operation is that of subcyclonic separation. A forced vortex in conjunction with gravity forces the grit to the sedimentation chamber floor. Grit that settles to the bottom moves along with other material towards the central axis 110 of the separation chamber 102. At the center, lighter organic particles and the liquid fraction are picked up in the aerated suction of the aeration jet recirculation stream. The organic particles and sewage are aerated, subjected to turbulent mixing, lifted to a liquid/air separation chamber where the air is vented, and the liquid phase now at an elevated head is used to drive the circulating jet mixer to provide subcyclonic rotational flow and a controlled degree of localized turbulence displaced radially from the zone 118 of communication between the sedimentation chamber 102 and the grit retention chamber 104. By increasing or decreasing the rotation velocity of the wastewater in the sedimentation zone, the minimum particle size of grit nominally removed by the system may be respectively increased or decreased. However, it will be recognized that inorganic-organic separation efficiency may decrease with decreasing rotational velocity and separated particle size.

The circulation rate may be readily controlled by throttling the air supply to the aeration jet wastewater recirculation system to provide a wide range of flow momentum transfer and aeration parameters. In the illustrated embodiment 10, the amount of air introduced into the conduit may be readily varied from about 10 to about 80 SCFM (typically about 40 SCFM) in operation, and may readily be provided by a small, one horsepower low pressure blower. Separated grit from the grit separation chamber drops into the grit retention chamber 104 where it is stored until removal. Prior to removal from the grit storage chamber, air may be introduced into the grit scour and removal air lift for scouring or washing the accumulated grit in the grit retention chamber, and lifting organic matter into the upper tank 102. Subsequently opening a discharge valve on the air lift pipe 182 allows transport of the grit to a grit removal and dewatering station (not shown) and/or ultimate disposal.

In the operation of the illustrated subcyclonic grit separator 10, it is desirable to maintain at least about one foot per second average rotational velocity of the wastewater in the sedimentation chamber 102 to maintain organic solids in suspension yet allow grit to settle in the separator. This velocity profile will vary in the vertical and radial directions from the axis. For example, the velocity variation will be relatively intense along a vertical plane intersecting the axis 110 immediately downstream of the discharge location of the recirculation jet, and there will be a more even velocity distribution along a similar plane intersecting the axis 110 and the discharge outlet 14 as schematically illustrated in FIG. 4. As indicated in FIG. 4, the jet momentum plume will be substantially dissipated within 180 degrees of angular travel along the sedimentation separation tank.

By average velocity is meant the instantaneous velocity averaged over the cross-sectional area of the wastewater liquid in the upper grit sedimentation chamber from the axis 110 to the outer wall surfaces 112, 114. The illustrated jet circulation system of the subcyclonic grit separator 10 is adapted to provide the desired velocity by jet momentum transfer to the wastewater in the sedimentation reservoir. The jet momentum flux transferred by the wastewater recirculation jet may be defined as follows:

$$\text{Jet Momentum Flux} = Q_w P_w V_o/g$$

where,
$Q_w$ = wastewater flow rate in cubic feet per second
$P_w$ = wastewater specific gravity (62.4 lbs/$^3$ft)
$V_o$ = jet velocity, in feet per second
g = gravitational constant (32.2 ft/sec$^2$)

In the illustrated embodiment 10, the local head drop (hw) across the jet nozzle (at low flow conditions) is about two feet, which, for an efficient recirculation jet nozzle having loss coefficient ($c_1$) approaching one, provides an average velocity $V_o$ of recirculated waste water of about 11 feet per second:

$$V_o = c_1 \sqrt{2g\, h_w}$$

The nozzle diameter of the illustrated embodiment 10 is two inches, which provides a throughput of about 130 gpm for the 2 foot hydraulic head of the recirculated wastewater stream under nominal operating conditions.

Because the influent flow to a typical wastewater treatment plant is highly variable, the grit removal system 10 may be designed for the peak flow rate. However, preaeration, grit washing and grit separation functions are substantially independent of influent flow rate. The system has no moving submerged parts, very low energy requirements and wide control of circulation rate, and produces minimal head loss through the unit.

In accordance with the present disclosure, it will be appreciated that a subcyclonic grit separation system has been disclosed which is capable of providing efficient and effective grit separation and removal. While the present invention has been particularly described with respect to the particular embodiment described herein, it will be appreciated that various modifications and adaptations may be made based on the present disclosure which are intended to be within the spirit and scope of the present invention as set forth in the following claims.

What is claimed is:

1. Apparatus for removing grit from a wastewater stream such as municipal sewage while maintaining the wastewater in an aerobic condition, comprising
    a subcyclonic sedimentation tank which is substantially radially symmetrical about a central axis and having a lower sediment accumulation surface projecting inward from the outer tank wall toward the central axis,
    a lower sediment accumulation tank beneath and in axial alignment with the sedimentation tank and in fluid communication therewith along the central vertical axis,
    inlet means for tangentially introducing the wastewater inlet stream to be degritted into the subcyclonic sedimentation tank at its periphery,
    outlet means for discharging a degritted wastewater stream,
    air lift pump means for withdrawing a portion of the wastewater from said sedimentation tank adjacent said sediment accumulation surface at the central vertical axis at a rate of at least about 0.02 of the volume of the wastewater in the sedimentation tank per minute, for introducing into the withdrawn stream at least about 0.1 standard cubic feet of air per gallon of said withdrawn stream for aeration of said withdrawn stream, and for lifting said withdrawn stream within an enclosed conduit under turbulent conditions to an elevation of at least about one foot above the surface of the wastewater in the sedimentation tank to provide an aerated, turbulently mixed recirculation stream, said air lift pump means comprising an airlift conduit having an intake opening adjacent said sediment accumulation surface, and an air-liquid separation chamber in fluid communication with said airlift conduit above the surface of wastewater in said subcyclonic sedimentation tank for separating said air from said withdrawn stream to provide said aerated recirculation stream, and
    discharge means for discharging said aerated turbulently mixed recirculation stream at a velocity of at least about 5 feet per second into the wastewater in the sedimentation tank in the direction of the tangential wastewater influent flow, at one or more locations radially displaced from the central axis.

2. Apparatus in accordance with claim 1 wherein said airlift conduit is positioned along said vertical axis, and wherein said discharge means comprises a recirculation stream jet supply conduit in fluid communication at its proximal end with said air-liquid separation chamber, and at least one jet nozzle at the distal end of said jet supply conduit, and wherein said airlift pump means introduces from about 0.2 to about 1 standard cubic feet of air per gallon of withdrawn wastewater stream into said airlift conduit, wherein said withdrawal rate is in the range of from about 0.05 to about 0.5 of the volume of the wastewater in the sedimentation tank per minute, and wherein the recirculation stream discharge means discharges the recirculation stream at a velocity in the range of from about 7 to about 15 feet per second.

3. A method for removing grit from a wastewater stream while maintaining the wastewater in an aerobic condition, comprising the steps of
    introducing the wastewater stream tangentially into an upper separation treatment zone which is substantially radially symmetrical about a central vertical axis and having a lower grit accumulation surface projecting inward toward the central axis, and communicating at the center thereof with a lower sediment accumulation zone at a central vertical axis,
    withdrawing wastewater containing suspended organic solids from the separation treatment zone adjacent the grit accumulation surface at a location generally adjacent the central vertical axis at a rate of at least about 0.02 of the volume of the wastewater in the separation treatment zone per minute to provide a recirculation wastewater stream, aerating the withdrawn wastewater recirculation stream by introducing into the withdrawn wastewater recirculation stream at least about 0.1 standard cubic feet of air per gallon of the recirculation stream,
    collecting grit in the lower sediment accumulation zone,
    lifting the recirculation stream under turbulent aeration conditions in a confined conduit zone to an elevation of at least about one foot above the surface of the wastewater in the separation treatment zone, separating at least a portion of the introduced air from the recirculation stream at an elevation above the surface of the wastewater to provide an aerated recirculation stream, conducting said aerated recirculation stream beneath the surface of the wastewater in the separation treatment zone to provide an aerated, pressurized recirculation stream, and
    discharging a degritted wastewater stream containing suspended organic solids from said upper separation treatment zone,
    discharging said aerated, pressurized recirculation stream as at least one jet into the wastewater in the separation zone at one or more locations radially displaced from the central axis in the direction of the tangential wastewater influent flow and beneath the surface of the wastewater in said upper separation treatment zone at a discharge velocity of at least about 5 feet per second.

4. A method in accordance with claim 3 wherein from about 0.2 to about 1 standard cubic feet of air is introduced per gallon of withdrawn wastewater stream, wherein said withdrawal rate is in the range of from about 0.05 to about 0.5 of the volume of the wastewater in the stream is discharged at a velocity in the range of from about 7 to about 15 feet per second.

5. Apparatus in accordance with claim 2 wherein said discharge nozzle is displaced from said axis, a distance of more than half of the radius of said sedimentation tank, and wherein said at least one jet nozzle is positioned such that wastewater discharged from said nozzle intersects wastewater introduced tangentially through said inlet means in said sedimentation tank.

6. A method in accordance with claim 4 wherein said aerated recirculation stream discharged beneath the surface of the wastewater provides an expanding, localized zone of turbulence which intersects the wastewater stream introduced tangentially into the upper treatment zone.

* * * * *